United States Patent [19]
Beardsley et al.

[11] Patent Number: 5,454,296
[45] Date of Patent: Oct. 3, 1995

[54] APPARATUS FOR CONTROLLING ORGANIC VAPORS EMITTED BY A FRYER

[75] Inventors: Charles A. Beardsley, Canoga Park, Calif.; Robert L. Romansik, Wexford, Pa.

[73] Assignee: Interstate Brands Corporation, Kansas City, Mo.

[21] Appl. No.: 174,848

[22] Filed: Dec. 29, 1993

[51] Int. Cl.⁶ .............................. A47J 37/12; F24C 15/20
[52] U.S. Cl. .................................. 99/403; 55/220; 55/242; 55/DIG. 36; 99/330; 99/408; 126/299 D; 126/299 R; 126/300
[58] Field of Search ............................ 99/403, 408, 339, 99/404–407, 330, 339; 126/299 R, 299 D, 299 E, 300; 55/242, 328, 444, 493, DIG. 36

[56] References Cited

U.S. PATENT DOCUMENTS

| | | |
|---|---|---|
| 399,430 | 3/1889 | Neef . |
| 486,550 | 11/1892 | Toliver et al. . |
| 996,554 | 6/1911 | Baldwin et al. . |
| 1,124,912 | 1/1915 | Judson . |
| 1,795,710 | 3/1931 | Clark . |
| 1,801,640 | 4/1931 | Reedy . |
| 2,678,599 | 5/1954 | Maddocks . |
| 2,743,529 | 5/1956 | Hayes . |
| 3,025,848 | 3/1962 | Malgesini . |
| 3,537,442 | 11/1970 | Berger . |
| 3,649,290 | 3/1972 | Angold ........................... 126/299 E |
| 3,751,885 | 8/1973 | McNeely ........................... 55/242 X |
| 3,762,394 | 10/1973 | Newcomer . |
| 3,791,370 | 2/1974 | Fauser . |
| 3,796,549 | 3/1974 | Hall ................................... 422/DIG. 36 |
| 4,160,407 | 7/1979 | Duym . |
| 4,231,769 | 11/1980 | Alrich ................................... 126/299 E |
| 4,366,749 | 1/1983 | Caridis et al. ........................... 99/407 |
| 4,421,094 | 12/1983 | Crane et al. . |
| 4,902,316 | 2/1990 | Giles, Sr. et al. . |
| 4,941,400 | 7/1990 | Moore . |
| 4,957,520 | 9/1990 | Parmentier et al. ................. 126/299 D |
| 4,971,023 | 11/1990 | Martinez . |
| 5,018,438 | 5/1991 | Grandi .................................... 99/404 |
| 5,125,328 | 6/1992 | Grandi . |
| 5,169,670 | 12/1992 | Yang .................................... 426/607 |
| 5,211,159 | 5/1993 | Lieblein et al. ..................... 126/299 R |
| 5,215,075 | 6/1993 | Caridis et al. . |

Primary Examiner—Timothy F. Simone
Attorney, Agent, or Firm—Nilsson, Wurst & Green

[57] ABSTRACT

Organic vapors emitted from a fryer containing a fatty substance heated to its vaporization temperature are condensed from a stream of exhaust air by a venturi-type scrubber. The scrubber condenses organic vapors into a liquid bath from which floatable by-products are removed and subjected to a further separation or clarification process. Air containing organic vapors is initially collected by a hood structure which defines a substantially confined emissions region above the fatty substance. In a preferred embodiment, the hood structure is configured to restrict the flow of ambient air into the emissions region, preferably causing air to enter the emissions region at a velocity of at least approximately 100 feet per minute.

10 Claims, 4 Drawing Sheets

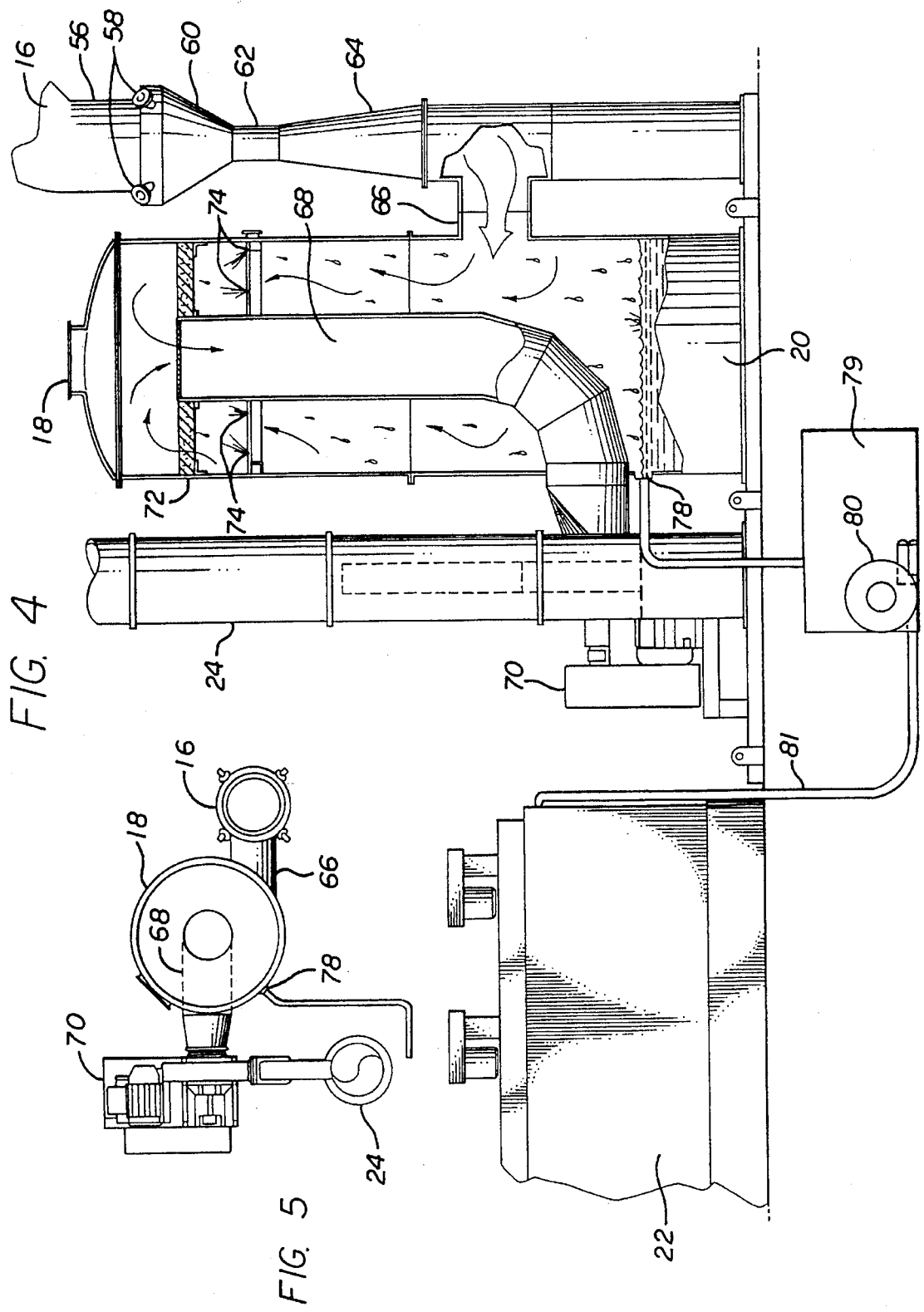

APPARATUS FOR CONTROLLING ORGANIC VAPORS EMITTED BY A FRYER

BACKGROUND OF THE INVENTION

This invention relates to emissions control systems and, more particularly, to an apparatus and method for collecting organic vapors and other pollutants emitted by a fryer.

The frying of foods in fatty substances can produce a substantial volume of pollutants, including both particulates (i.e., smoke and droplets of organic material) and organic vapors. Of these, organic vapors are particularly difficult to control when the cooking takes place at temperatures near the vaporization or "smoke" temperature of the fatty substance. Organic vapors, classified as non-methane hydrocarbons (NMHC), are difficult to remove by filtration alone. They normally require elaborate control techniques, such as incineration, which have significant disadvantages. Incineration requires significant energy input and creates new compounds which raise environmental issues of their own. Nevertheless, filtration, electrostatic precipitation and incineration were the only control techniques previously accepted by the South Coast Air Quality Management District (SCAQMD) in Southern California for controlling emissions of any kind from a fryer, and only incineration was accepted for controlling organic vapor emissions.

The problem of controlling organic vapors produced by frying foods has been addressed in U.S. Pat. No. 3,762,394 to Newcomer, U.S. Pat. No. 4,941,400 to Moore, and U.S. Pat. No. 5,215,075 to Caridis et al. The Newcomer and Caridis et al. patents both teach that a vapor-containing air stream should be incinerated, although Newcomer also describes a separate condenser or "scrubber" for use before incineration to remove excess moisture from the exhaust air. The scrubber of Newcomer is also said to remove oil particles from the air, but evidently does not mitigate the problem of organic vapor emissions. Air leaving the scrubber is specifically described as being "odor laden".

The Moore patent discloses a ventless hood for use with a pressure cooker containing a combination of heated oil and steam. The output of the cooker is released into a bath of water, which is said to act as a scrubber to condense steam and vaporized cooking oil. The patent specifically teaches that the bath must be cooled, however, to keep it from boiling and thereby releasing excessive cooking gases to the atmosphere. This technique, with its substantial cooling requirement, is designed for use with a single pressure cooker and would not be suitable for large scale operations, such as an open vat fryer.

Therefore, it is desirable in many applications to provide an apparatus and a method for efficiently and economically extracting organic vapors from the exhaust gas stream of a fryer in which a fatty substance is maintained at an elevated temperature.

SUMMARY OF THE INVENTION

The present invention makes use of a venturi-type scrubber, in combination with one or more separation stages, to control both particulates and organic vapors emitted from a fryer containing a fatty substance heated to a temperature nears its smoke or vaporization temperature. Prior to the invention, scrubbers of the venturi type were used for particulate emissions but were not believed to be suitable for eliminating organic vapors on a large scale. This belief is reflected in the fact that scrubbers were not previously endorsed by environmental regulatory agencies, such as the SCAQMD, as one of the "Best Available Control Technologies" (BACT) for organic vapor (NMHC) emissions. In developing the system of the present invention, however, it was discovered that a properly configured venturi-type scrubber is capable of extracting a high percentage of the environmentally sensitive organic vapors created by frying foods at high temperatures. When followed by separation of the liquid components from the air, and further separation of floatable organic components from the liquid, virtually all species of concern are removed. The resulting air is odorless and invisible, and the clarified liquid is clean enough to be reused in the scrubber or disposed of in a sewer without adverse effects. Even the collected organic material is useful as feed for livestock.

When using a venturi-type scrubber in accordance with the present invention, it is important to control the flow of emissions-containing air by substantially confining the area above a fryer's surface with a hood structure. Openings in the hood structure are kept to a minimum and their dimensions are carefully chosen relative to the flow of air through the hood to cause air to be drawn through the openings at a velocity of at least approximately 100 feet per minute. In addition to enhancing scrubber operation, these conditions permit several fryers to be serviced by a single scrubber. The resulting system is much more efficient and cost-effective than the alternative of incineration.

Accordingly, the apparatus and method of the present invention control organic vapors emitted from a fryer containing a fatty substance heated to a temperature near its smoke or vaporization temperature. The apparatus comprises: a hood structure having a peripheral edge portion extending toward the fryer to define a substantially confined emissions region above the fatty substance; a mechanism for creating a partial vacuum within the hood structure to drawn air containing organic vapors from the emissions region; and a venturi-type scrubber communicating with the hood structure to extract organic vapors from the air by condensation. In a preferred embodiment, the venturi-type scrubber mixes the air with water at a high velocity, collects a liquid output of the mixing process, and ultimately removes floatable by-products of the collected liquid. The scrubber may also conduct a gaseous component of the mixing process away from the collected liquid and then expose the gaseous output to a water spray to remove any residual organic mist. A liquid clarifier can then be utilized to remove substantially all remaining floatable components from the collected liquid.

In another embodiment, the hood structure defines at least one opening through which ambient air is drawn into the emissions region, and the opening is dimensioned to restrict the flow of such air. The openings are preferably dimensioned in accordance with the flow of air from the hood to cause air to be drawn through the openings at a velocity of at least approximately 100 feet per minute. This can be done by providing the openings with a total cross sectional area (A) defined by the relationship $A \leq (0.01 \text{ minute/feet}) \cdot F$, where A is measured in square feet and F is the volumetric rate of air flow through the hood structure, measured in cubic feet per minute.

BRIEF DESCRIPTION OF THE DRAWINGS

The above and other features of the present invention may be more fully understood from the following detailed description, taken together with the accompanying drawings, wherein similar reference characters refer to similar elements throughout and in which:

FIG. 4 is a fragmentary side elevational view of a venturi-type scrubber, a cyclonic separator and a clarifier of the system of FIG. 3, partially broken away; and FIG. 5 is a top plan view of the scrubber of FIG. 4.

DESCRIPTION OF THE PREFERRED EMBODIMENTS

Figure 1:
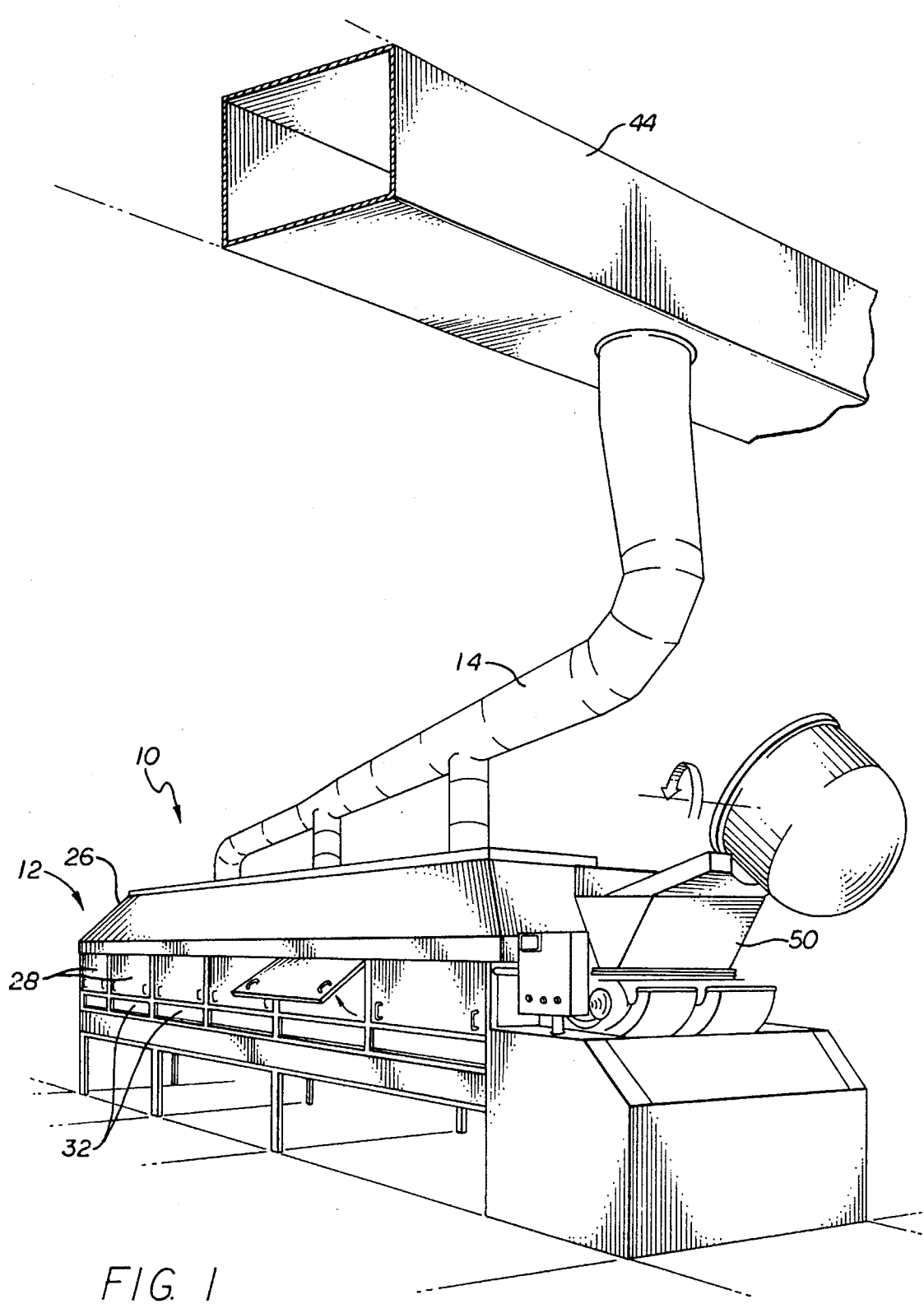
FIG. 1 is a perspective view of a fryer serviced by an emissions control system constructed in accordance with one embodiment of the present invention.
Figure 2:
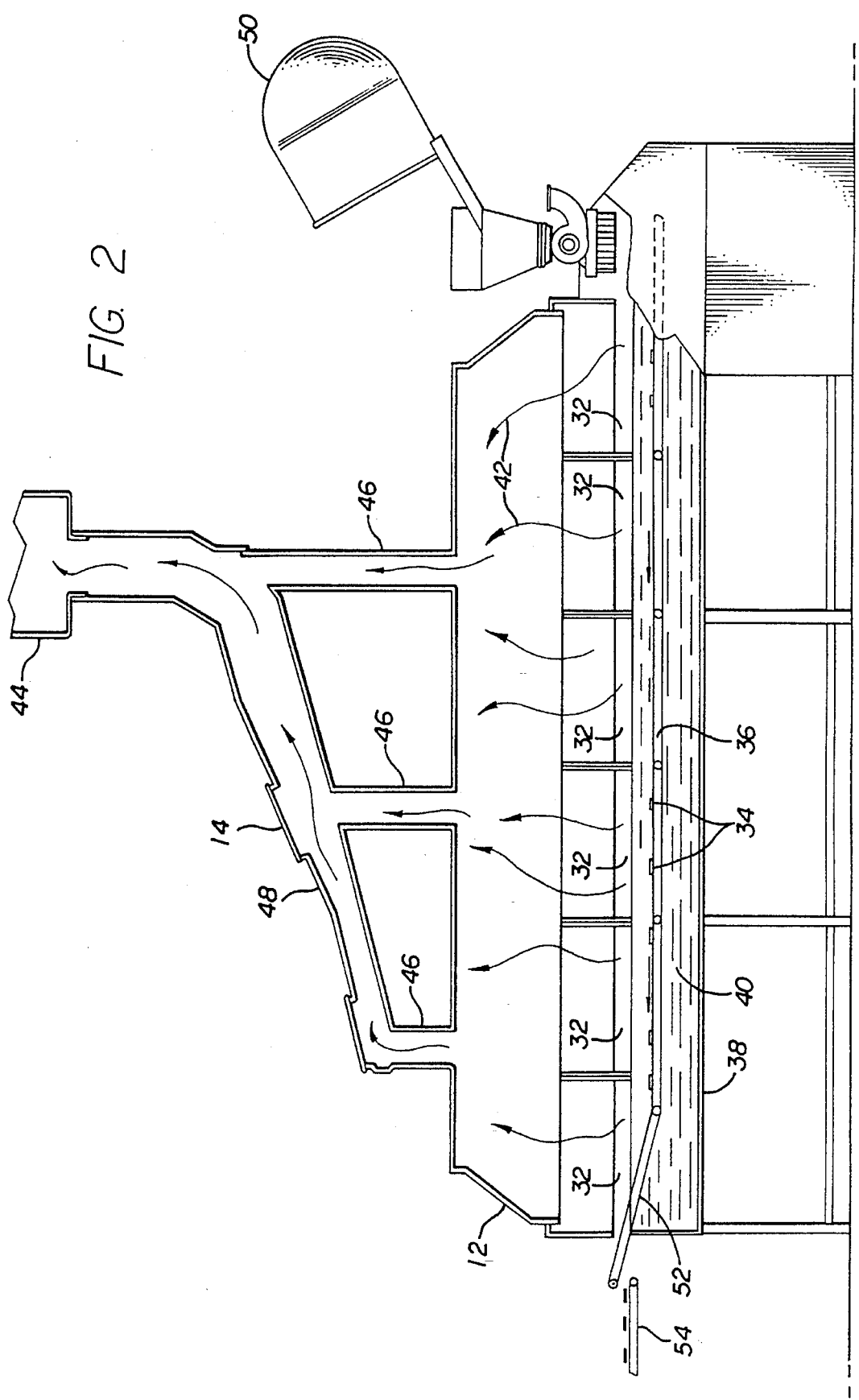
FIG. 2 is a front view, partially in elevation and partially in vertical section, showing the movement of emissions-containing air through the fryer of FIG. 1.
Figure 3:
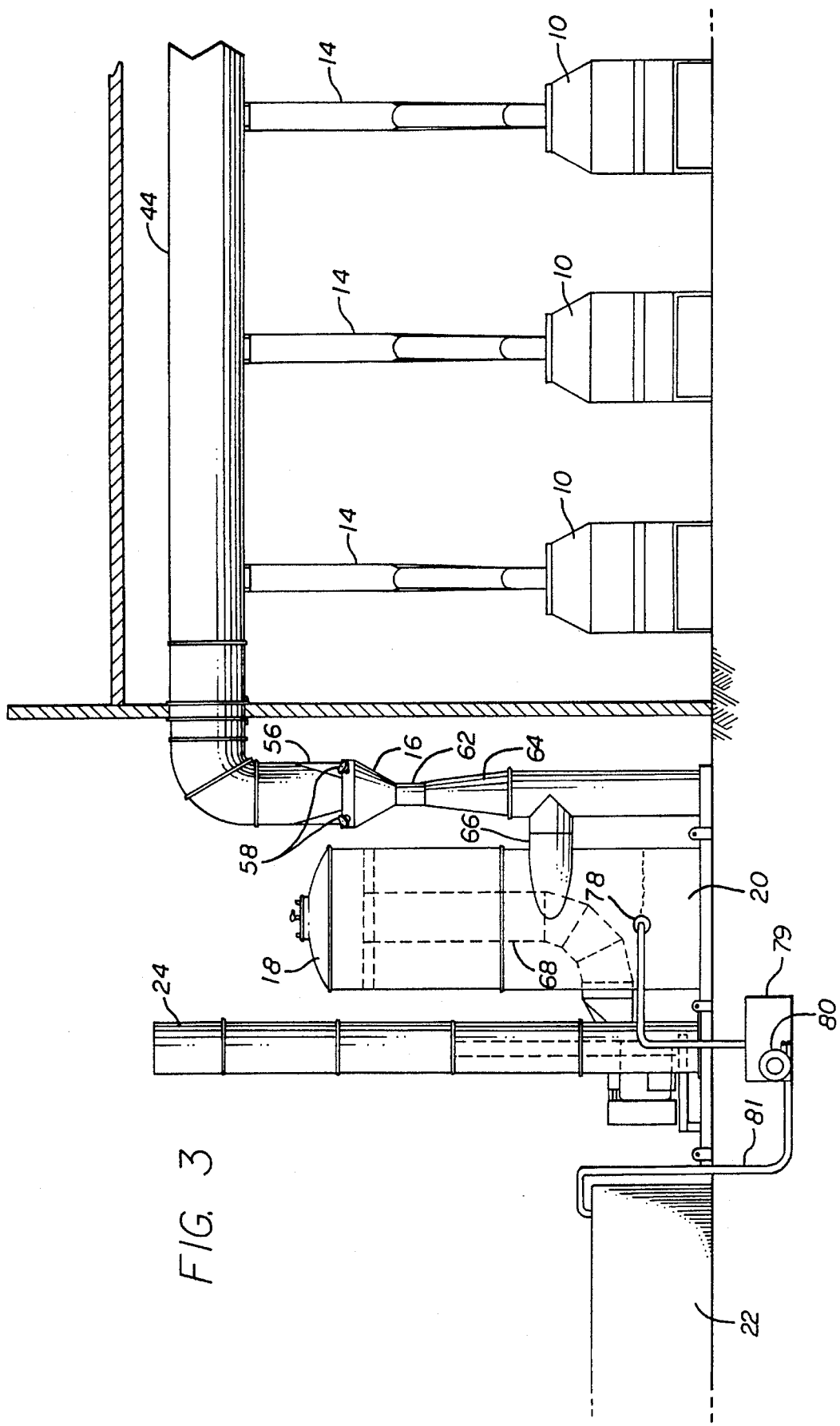
FIG. 3 is a vertical elevational view of an emissions control system constructed in accordance with another embodiment of the present invention and connected to serve a plurality of separate fryers.

Referring to FIGS. 1–3, which illustrate a system constructed in accordance with a preferred embodiment of the present invention, emissions from one or more fryers 10 are drawn through a hood structure 12 and ductwork 14 to a venturi scrubber 16 and a cyclonic separator 18 for removing organic vapors and other potential pollutants from the exhaust stream of the fryers. The venturi scrubber 16 condenses organic vapors emanating from a heated fatty substance of the fryers 10, and the cyclonic separator 18 separates the liquid condensate from the air. To accomplish this liquid/gas separation, air exiting the venturi scrubber 16 is directed horizontally into a tank of the cyclonic separator 18 in a direction substantially tangential to the wall of the tank. This creates a circular pattern of air flow within the cyclonic separator, from which condensed liquid particles fall into an aqueous bath at a lower end 20. Floatable by-products within the aqueous bath are then passed to a final separator or "clarifier" 22. The scrubbed air is released to the atmosphere through an exhaust stack 24. Thus, organic vapors are removed from the exhaust of the fryers 10 by condensation and are later separated from water used in the condensation process to leave both air and water which are free of objectionable levels of organic material. The separated organic material can then be used as feed for livestock, particularly hogs.

Referring specifically to FIG. 1, the hood structure 12 is designed to substantially enclose an emissions region above the fryer surface and thereby collect emissions created by the fryer. Thus, the hood structure 12 has an upper hood portion 26 and a plurality of removable side panels 28 which combine to confine the emissions region. The side panels 28 extend downwardly from a lower edge 30 of the hood portion 26 and terminate a preselected distance above the fryer. The bottom edge of the side panels 28 and the upper edge of the fryer therefore combine to form a plurality of air intake openings 32 for admitting ambient air to the emissions region. The air intake openings 32 are dimensioned so that air enters the hood structure 12 at a specified velocity, which in a preferred embodiment is at least approximately 100 feet per minute. This velocity assures that emissions are confined within the hood structure 12 and passed upwardly through the ductwork 14 to the scrubber system of FIG. 3. It also minimizes the volume of air which must be scrubbed and increases the efficiency of the scrubbing operation.

Although the removable side panels 28 of the hood structure 12 are preferably kept in the closed position while the fryer 10 operates, they can be tilted upwardly as shown in FIG. 1, or even removed entirely, to facilitate servicing of the fryer and the emissions control system.

Referring now to FIG. 2, donuts or other food items 34 are transported by a conveyor 36 which extends substantially the length of a vat 38 of the fryer 10. The vat 38 contains a fatty substance 40 which is maintained at or near its smoke or vaporization temperature to fry the food items 34, thereby creating emissions indicated by arrows 42. These emissions contain a significant amount of organic vapors, which are largely the vapor form of the fatty substance 40, as well as particulate emissions including, among other things, droplets of the fatty substance 40 in liquid form. Emissions 42 are substantially confined within the hood structure 12 from which they are drawn upwardly through the ductwork 14 to a main duct 44 leading to the venturi scrubber 16 (FIG. 3). The ductwork 14 includes individual feeder ducts 46 which are spaced along the hood structure 12 and lead to an intermediate portion 48 which provides the desired pressure drops and flow rates within the system. Thus, the ductwork 14 is dimensioned and arranged to create substantially equal flow through the feeder ducts under predetermined system flow conditions. The air intake openings 32 are designed with these conditions in mind to cause ambient air to be drawn into the system through the intake openings 32 at a preselected velocity.

Although the fryer 10 is illustrated in FIGS. 1–3 as a device for frying donuts, the principles of the present invention apply broadly to any system for frying food items containing batter or dough at temperatures which create substantial emissions in the form of organic vapors. In the specific context of donut frying, however, the fryer 10 contains a shortening material made up primarily of beef tallow and has an apparatus 50 at one end for the automatic introduction of batter in the shape of donuts. At the opposite end of the fryer, the conveyor 36 is provided with an inclined portion 52 which deposits fried donuts onto a separate conveyor 54 for packaging or further processing. This process is typically performed around-the-clock to maximize the production capability of the fryers 10. The venturi scrubber 16, cyclonic separator 18 and clarifier 22 must therefore operate continuously with little or no maintenance to avoid slowing down the cooking process.

Turning to FIGS. 4 and 5, which illustrate the condensation and separation mechanisms in greater detail, the venturi scrubber 16 has an intake section 56 communicating with the main duct 44 to receive emissions-containing air from the fryers. The air is then sprayed with water from a plurality of nozzles 58 and passed through a tapered section 60 to a venturi section 62. In passing through the tapered section 60 and the venturi section 62, the emissions-containing air becomes mixed with the water spray and is accelerated to a very high velocity. It then passes through an expansion section 64 where it is cooled by expansion and directed laterally through a tangential input 66 of the cyclonic separator 18. As illustrated most clearly in FIG. 5, the inlet 66 is substantially tangential to the interior wall of the cyclonic separator 18, producing a circular flow above the aqueous mixture at the lower end 20. The circular motion is facilitated by a central conduit 68 positioned to conduct air downwardly within the separator and out through the exhaust stack 24. This flow, and indeed the flow of air throughout the emissions control system, is driven by a fan assembly 70 between the central conduit 66 and the exhaust stack 24.

The emissions-containing air drawn along the main duct 44 is therefore mixed thoroughly with water, accelerated to a high velocity and then expanded within the venturi scrubber 16, only to be released into the much larger volume of the cyclonic separator 18 as a stream of air containing water and other condensed liquids. Upon entering the cyclonic separator 18, the liquids fall by gravity to the lower end 20 and the scrubbed air is drawn upwardly through a mesh filter 72 which removes any large droplets from the air stream. Immediately below the mesh filter 72 are a plurality of demister nozzles 74 which spray a fine water mist through the air to remove any remaining droplets of organic material. The scrubbed and demisted air is then drawn downwardly through the central conduit 68 and expelled through the exhaust stack 24.

Organic vapors condensed in the venturi scrubber 16 are thus collected as a floating surface layer of the water bath at the lower end 20 of the cyclonic separator 18. The surface layer is skimmed through an outlet 78 of the cyclonic separator into a sump 79 located below ground level. From there, the skimmed material is moved by a pump 80 through a line 81 to the clarifier 22. The clarifier 22 is preferably a plate-type separator, such as that marketed by Wemco of Sacramento, Calif., which removes organic material from water to reduce its concentration to as little as approximately 15 ppm. The water output from the clarifier 22 is therefore suitable for disposal through municipal sewer lines.

In one specific embodiment of the present invention, four separate fryers are modified in accordance with the teachings of the present invention and connected to a venturi-type scrubber, a cyclonic separator and a clarifier of the type described above. Specifically, the fryers include two 20-foot by 4-foot donut fryers, one 25-foot by 4-foot "jumbo" fryer and one 34-foot by 4-foot pie fryer. Each fryer is provided with a hood structure 12 substantially the same length and width as the fryer, and a plurality of side panels 28 extending downwardly from the hood structure to a point five inches above the top of the fryer vat 38. Thus, the emissions regions above the heated oil are substantially confined with the exception of a five-inch vertical gap surrounding the fryer vat 38. This gap corresponds to the air intake openings 32 described above and is designed to admit ambient air into the emissions region at a preselected desired velocity for a particular volume of air flow through the hood structure. For the two donut fryers described above, the ductwork 14 draws air from the hood structure at a rate of 2750 cubic feet per minute. Each of these fryers has a circumference of 52 feet, 5 inches, yielding an opening of approximately 22 square feet for ambient air to enter the hood. Under these conditions, ambient air is drawn into the hood structure at a velocity of 125 feet per minute. This is slightly more than the minimum velocity of 100 feet per minute.

Of course, it is important to distribute total air flow uniformly along the cooking area. This is accomplished by the ductwork 18 in which the three feeder ducts 46 are spaced equally along the length of the hood portion 26. Each feeder duct is ten inches in diameter and is connected to intermediate ducting suitable for equalizing the velocity of emissions-containing air through the ducts. In this case, the velocity of air through each feeder duct is approximately 1600 feet per minute.

Under the foregoing conditions, the scrubber 16 may be a Venturi Scrubber of the type marketed by Andersen 2000, Inc. as Model WAF-121 and the separator 18 may be an Andersen Cyclonic Separator Model VES-127. The cyclonic separator preferably includes a Mesh Pad Mist Eliminator which includes both the mesh filter 72 and demister nozzle 74 described above, and the fan assembly 70 may be an Andersen Induced Draft Fan Model M-IV-23HE. This equipment has a flow capacity of 14,000 cubic feet per minute and is suitable for handling the four fryers described above when tallow within the fryers is maintained at approximately 375°–390° F. Under tests performed by outside consultants at an average maximum fryer temperature of 377° F., the system was found to be 86 percent efficient in removing particulates and 89 percent efficient in removing the more troublesome Non-Methane Hydrocarbons (NMHC) from a combined exhaust gas stream.

It will be appreciated from the foregoing that the area of the air intake openings 32 of the hood structure 12 is important to the practice of the present invention and is preferably related to the total volume of air flow through the hood structure 12. More specifically, it has been found that the total aperture area (A) of the air intake openings 32 for each of the hood structures 12 may be defined by the relationship $$A \leq (.01 \text{ minute/feet}) \cdot F,$$

where A is measured in square feet and F is the volumetric rate of air flow through the hood structure, measured in cubic feet per minute. Under these conditions, ambient air is drawn through the openings 32 at a velocity of at least 100 feet per minute, retaining emissions from the fryer 10 within the hood structure 12 and causing them to be drawn upwardly through the ductwork 14 and the main duct 44 to the venturi scrubber 16. At the same time, the total flow of air through the system remains reasonable, causing the scrubber and the separator to be used efficiently. The venturi scrubber 16 and the cyclonic separator 18 are then capable of removing substantially all of the emissions created by several fryers, including the troublesome organic vapors produced by evaporation of the frying medium itself.

In the case of frying pastries, the fatty substance used as a frying medium is predominantly beef tallow, which can create more significant environmental problems than the vegetable oil used to fry potatoes and the like. More specifically, the fatty substance may be a commercially available form of fresh baking fat which is actually a blend of beef tallow and a relatively small amount of hydrogenated vegetable oil. An example is a product marketed by Coast Packing Company of Vernon, Calif. under the designation "Supreme Animal-Vegetable Shortening". The smoke point of fresh baking fat, based on vendor specifications, is typically 435°–455° F. The smoke point during production is approximately 385° F., however, because portions of the vat are often hotter than the fat.

From the above, it can be seen that the apparatus and method of the present invention for controlling emissions from a high temperature fryer is uniquely capable of removing organic vapors and is capable of operating indefinitely with little or no maintenance.

While certain specific embodiments of the invention are disclosed as typical, the invention is not limited to those particular forms, but rather is applicable broadly to all such variations as fall within the scope of the appended claims.

What is claimed is:

1. Apparatus for controlling organic vapors emitted from a fryer containing a fatty substance heated to a temperature near its smoke or vaporization temperature comprising:

a hood structure having a peripheral edge portion extending toward the fryer to define a substantially confined emissions region above the fatty substance;

a mechanism for creating a partial vacuum within the hood structure to draw air containing organic vapors from said emissions region; and a venturi-type scrubber communicating with the hood structure to extract organic vapors from said air by condensation.

2. The apparatus of claim 1 wherein the venturi-type scrubber comprises:

means for mixing said air with water at a high air velocity;

means for collecting a liquid output of the mixing process; and means for removing floatable by-products of the collected liquid.

3. The apparatus of claim 2 wherein the venturi-type scrubber further comprises:

means for conducting a gaseous output of the mixing means away from the collected liquid; and means for exposing the gaseous output to a subsequent water spray to remove organic mist therefrom.

4. The apparatus of claim 2 which further comprises:

a liquid clarifier for subsequently removing substantially all remaining floatable compounds from said collected liquid.

5. Apparatus for controlling organic vapors emitted from a fryer containing a fatty substance heated to a temperature near its smoke or vaporization temperature comprising:

a hood structure having a peripheral edge portion extending toward the fryer to define a substantially confined emissions region above the fatty substance;

a mechanism for creating a partial vacuum within the hood structure to draw air containing organic vapors from said emissions region and through said hood structure; and a venturi-type scrubber communicating with the hood structure to extract organic vapors from said air by condensation;

the hood structure defining at least one opening through which ambient air is drawn into said emissions region, said at least one opening dimensioned to restrict such ambient air flow.

6. The apparatus of claim 5 wherein:

said at least one opening is dimensioned accordance with the flow of air through the hood structure to cause air to be drawn through said opening and into said emissions region at a velocity of at least approximately 100 feet per minute.

7. The apparatus of claim 5 wherein:

the total area (A) of said at least one opening is defined by the relationship $$A \leq (.01 \text{ minute/feet}) \cdot F,$$

where:

A is measured in square feet; and

F is the volumetric rate of air flow through the hood structure, measured in cubic feet per minute.

8. Apparatus for controlling organic vapors emitted from a plurality of fryers containing a fatty substance heated to a temperature near its smoke or vaporization temperature comprising:

a hood structure for each of said fryers, said hood structures having peripheral edge portions extending toward the fryers to define substantially confined emissions regions above the fatty substance;

a mechanism for creating a partial vacuum within the hood structures to draw air containing organic vapors from said emissions regions and through the hood structures to a common duct; and a venturi-type scrubber communicating with said common duct to extract organic vapors from said air by condensation; each of the hood structures having at least one opening through which ambient air flows into the corresponding one of said emissions regions, said openings being dimensioned to restrict said flow of ambient air.

9. The apparatus of claim 8 wherein:

said openings are dimensioned in accordance with the flow of air through said hood structures to cause ambient air to be drawn through said opening and into said emissions regions at a velocity of at least approximately 100 feet per minute.

10. The apparatus of claim 8 wherein:

the total opening area (A) for each of the hood structures is defined by the relationship $$A \leq (.01 \text{ minute/feet}) \cdot F,$$

where:

A is measured in square feet; and

F is the volumetric rate of air flow through the hood structure, measured in cubic feet per minute.

* * * * *

UNITED STATES PATENT AND TRADEMARK OFFICE
CERTIFICATE OF CORRECTION

PATENT NO.   : 5,454,296
DATED        : October 3, 1995
INVENTOR(S)  : Charles A. Beardsley et al.

It is certified that error appears in the above-indentified patent and that said Letters Patent is hereby corrected as shown below:

Column 1, line 62, delete "nears" and substitute therefor --near--;

Column 2, line 34, delete "drawn" and substitute therefor --draw--;

Column 7, line 40, after "dimensioned", insert --in--.

Signed and Sealed this

Twenty-sixth Day of December, 1995

*Attest:*

BRUCE LEHMAN

*Attesting Officer*   Commissioner of Patents and Trademarks